Aug. 3, 1926. 1,594,437
W. T. WALSH
LOCKING HANDLE DEVICE FOR RECEPTACLES
Filed March 19, 1926

Inventor
William T. Walsh
By Owen & Owen
Attorneys

Patented Aug. 3, 1926.

1,594,437

UNITED STATES PATENT OFFICE.

WILLIAM T. WALSH, OF TOLEDO, OHIO.

LOCKING HANDLE DEVICE FOR RECEPTACLES.

Application filed March 19, 1926. Serial No. 95,849.

This invention relates to devices for connecting together two separable members or parts in substantially locked condition, regardless of whether these members are in a state of rest or suspension, or of being conveyed or being carried about by hand, but particularly relates to devices of the type for preventing the accidental or intentional separation of such members or parts.

The devices of this invention are applicable to numerous articles of manufacture, such as hand receptacles for garbage, ice cream receptacles, freezers, or in fact almost any and every receptacle device where there are two separable members to be held together.

In carrying out this invention, a bail handle of peculiar construction is pivoted to one part or member and adapted to be swung over into extreme positions to be held in or come to a stop in an intermedate position, and in the latter and extreme position, to engage a projection of the other member and to hold the same against displacement or separation, whether accidentally or designedly intentioned, the end portion of the bail handle is formed with an elongate loop portion engageable with ears on the body member, this construction providing a decidedly simple and inexpensive arrangement. Depending from the cover may be a hook means which engages the elongate looped end portion of the bail handle to prevent accidental or unwarranted detaching of the cover and body member. A more detail description will hereinafter appear.

Figure 1:
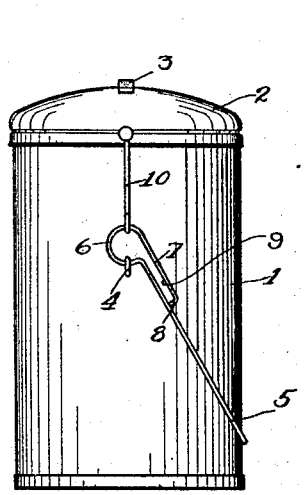
Figure 3:
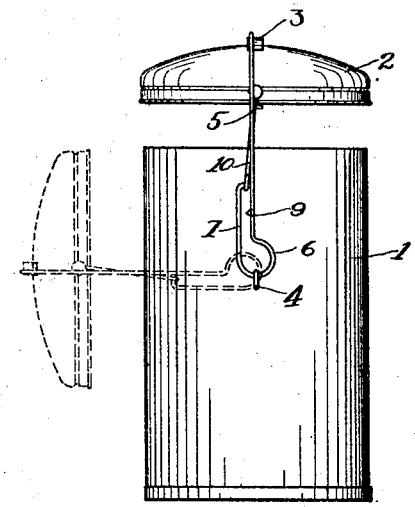
Figure 2:
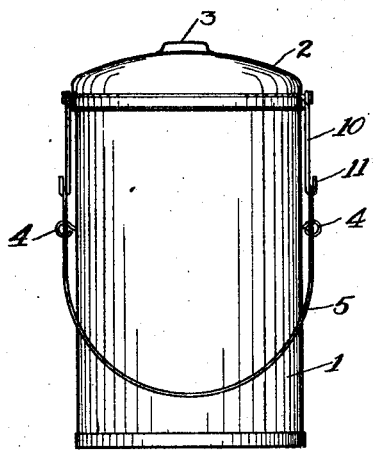
Figure 4:
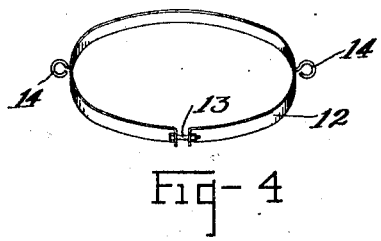

The invention is shown by way of illustration in the accompanying drawings, in which:

Fig. 1 is a side elevation of a receptacle embodying the invention showing the cover in locked position; Fig. 2 is a view similar to Fig. 1 of another part of the container; Fig. 3 is a view similar to Fig. 1 showing the manner of separating the cover from the body portion; and Fig. 4 is a perspective view of a detachable ring which may be attached to different sized receptacles and to which the bail handle may be attached.

The illustrated embodiment of the invention comprises an open ended body member on the top of which is set a cover 2. The cover may be provided with a handle 3 of the usual type. Attached to opposite sides of the body member 1 are apertured ears or eyes 4, and pivoted to the ears 4 is a wire bail 5.

The end portions of the bail 5 are rounded as indicated at 6 and bent in a reverse direction as indicated at 7, the extreme end portion being intermediate as shown at 8. This construction provides an elongate slot 9, and it will be seen that the curved end portions 6 engage the ears 4. Pivoted to the cover 2 on opposite sides thereof are depending arms 10 having hooked end portions 11 which engage the curved portion 6 of the bail 5 when the bail is swung against the side of the body member 1, as shown in Fig. 1. In this position the cover 2 is securely locked to the body member 1.

When it is desired to unlock the cover 2 to separate it from the body member 1 the bail handle 5 is swung upwardly as shown in Fig. 3, and by lifting upwardly on the handle 3 the cover 2 may be separated from the body member 1, hook 11 sliding in the elongate slot 9. The cover may then be swung to one side of the body member as indicated by the dotted lines in Fig. 3. When it is again desired to lock the cover in place the cover may be swung upwardly and positioned on top of the body member, and thereafter the bail handle 5 may be swung downwardly against the side of the body member.

As shown in Fig. 4, a ring 12 adjustably held together by a bolt and nut 13, and having oppositely disposed ears 14 may be used if desired. This construction may be applied to a receptacle which is not provided with the ears 4, and it will be seen that this ring may be tightly clamped around the body member, and by attaching the above described locking arrangement the desired result may be attained. It may also be desirable to provide a ring for supporting the hooked arm 10 and this device may be readily sold as a unit for attachment to cans not provided with ears or convenient means for pivoting the arms 10.

While I have shown and described a construction which is the best form known to me at the present time, it is to be understood that numerous changes in details of construction and arrangement may be effected without departing from the spirit of the invention especially as defined in the appended claims.

What I claim as new and desire to secure by Letters Patent, is:

1. A receptacle comprising an open ended body member, a cover adapted to set down on the body member, apertured ears on said body member, a bail handle having an elongate looped end portion engaging said ears, and hook means depending from said cover and engaging said looped end portion whereby when said bail handle is disposed against the side of said body member the cover is locked in position on the body member and when the bail handle is swung upwardly the cover is released and may be moved to one side of the body member.

2. A receptacle comprising an open ended body member, a cover adapted to set down on the body member, apertured ears on said body member, a bail handle having a looped end portion engaging said ears, and a pair of hooks pivoted to said cover and detachably engaging said looped end portion whereby when said bail handle is disposed against the side of said body member the cover is locked in position on said body member, and when the bail handle is swung upwardly the cover is released and may be moved to one side of the body member.

3. A receptacle comprising an open ended body member, a cover adapted to set down on the body member, apertured ears on said body member, a wire bail handle having a looped end portion consisting of a return bend of the end portions of the bail handle to form an elongate slot, said looped end portions engaging said ears, and hook means depending from the cover and engaging said looped end portion whereby when said bail handle is disposed againust the side of the body member the cover is locked in position on said body member, and when the bail handle is swung upwardly the cover is released and may be moved to one side of the body member.

In testimony whereof I have hereunto signed my name to this specification.

WILLIAM T. WALSH.